(12) United States Patent
Horibe et al.

(10) Patent No.: US 8,588,588 B2
(45) Date of Patent: Nov. 19, 2013

(54) TELEVISION RECEIVER AND PROGRAM DATA RECEPTION METHOD

(75) Inventors: Tatsuto Horibe, Hyogo (JP); Tomoaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 13/057,855

(22) PCT Filed: Sep. 10, 2009

(86) PCT No.: PCT/JP2009/004485
§ 371 (c)(1),
(2), (4) Date: Feb. 7, 2011

(87) PCT Pub. No.: WO2010/029743
PCT Pub. Date: Mar. 18, 2010

(65) Prior Publication Data
US 2011/0142423 A1      Jun. 16, 2011

(30) Foreign Application Priority Data
Sep. 12, 2008   (JP) .................................. 2008-234679

(51) Int. Cl.
*H04N 5/76*          (2006.01)
(52) U.S. Cl.
USPC ........................................................ 386/291
(58) Field of Classification Search
USPC ......... 386/200, 212, 213, 214, 234, 239, 248, 386/291, 292, 293, 296
See application file for complete search history.

(56) References Cited

U.S. PATENT DOCUMENTS

| | | | |
|---|---|---|---|
| 6,212,327 B1 * | 4/2001 | Berstis et al. | 386/291 |
| 2002/0042916 A1 * | 4/2002 | Mineyama | 725/39 |
| 2007/0192793 A1 * | 8/2007 | Song et al. | 725/39 |

FOREIGN PATENT DOCUMENTS

| | | |
|---|---|---|
| JP | 11-341371 A | 12/1999 |
| JP | 2001-145087 A | 5/2001 |
| JP | 2004-193920 A | 7/2004 |
| JP | 2006-005700 A | 1/2006 |
| JP | 2007-214794 A | 8/2007 |
| JP | 2008-199345 A | 8/2008 |

OTHER PUBLICATIONS

International Search Report for PCT/JP2009/004485, Dec. 22, 2009.

* cited by examiner

*Primary Examiner* — Tat Chio
(74) *Attorney, Agent, or Firm* — RatnerPrestia

(57) ABSTRACT

Using a remote control, a viewer specifies the channel and the date and time of a program that he/she wants to watch. A reception method selection unit determines, based on the date and time, whether the program is currently being broadcast or was broadcast in the past, and then selects a reception method. An SI information storage unit stores URL information of program distribution servers having past programs. The URL information is contained in the SDT in SI information transmitted together with a program. When the viewer chooses a past program, an IP data reception unit connects to the corresponding program distribution server based on its URL so as to transmit the date and time thereto, and receives the past program that the viewer wants to watch via IP network.

6 Claims, 16 Drawing Sheets

TELEVISION RECEIVER AND PROGRAM DATA RECEPTION METHOD

TECHNICAL FIELD

The present invention relates to a television receiver allowing the viewer to choose and watch programs which are currently being broadcast, or were broadcast in the past, and also relates to a program data reception method.

BACKGROUND ART

With the recent digitalization of terrestrial and satellite television broadcasting, it has become possible to transmit a comparatively large volume of program information together with program content. A typical example of the program information is electronic program guide information.

The technique to compress moving images, which has been obtained from the digitalization of broadcasting, has made it possible to broadcast an extremely large amount of program content. This approach, however, requires a mechanism which allows the viewer to easily choose from a large number of programs. The most typical mechanism to meet this demand is an electronic program guide. By displaying an electronic program guide on the screen of a television receiver, the viewer can choose a program without checking a TV program page in a newspaper or a TV program magazine. When the amount of the information to be displayed is too large to fit within the screen, the viewer can generally scroll the screen vertically and horizontally in the same manner as in a personal computer.

With the development of the broadband IP network, on the other hand, IP moving-image distribution service is spreading because of its bidirectional communication feature. While digital broadcasting can provide only programs which are currently being broadcast, the IP moving-image distribution service stores past broadcast programs in servers and distributes the programs upon request from individual viewers. This service, which is an example of what is called VOD (Video On Demand) service, is attractive to viewers who want to watch past broadcast programs that they missed or recommended by friends.

Similar to the case of choosing currently broadcast programs, the IP moving-image distribution service requires a mechanism which allows the viewer to easily choose a desired past program. The number of programs to be chosen by the viewer is so large that, without a simple choice function, the mechanism is not viewer-friendly.

To meet this demand, the following approach has been suggested (see, for example, Patent Literature 1). A television receiver displays on a screen two types of electronic program guide information together as a combined electronic program guide. One of the two types of the information is received via a broadcast path, and the other type is received via a communication path (generally, IP network). If the viewer chooses a currently broadcast program on the electronic program guide, the chosen program is obtained via the broadcast path and displayed. When the chosen program is a past program, it is obtained from an image distribution server via the communication path and displayed. This mechanism allows the viewer to seamlessly search the past, present, and future electronic program guides on the same screen, thereby greatly reducing the workload of the viewer in program choice.

The two types of electronic program guide information are combined by the television receiver in Patent Literature 1, but it has been suggested to combine them on the transmitter side (see, for example, Patent Literature 2). According to this mechanism, the two types of electronic program guide information are previously combined on the transmitter side to avoid complex processing on the receiver side.

Seamlessly displaying the past, present, and future electronic program guides can enhance the convenience of viewers, but the following problem remains unsolved. In the approach of Patent Literature 1, the two types of electronic program guide information received respectively via the broadcast and communication paths have to be combined by the viewer's television receiver. This makes the television receiver complex and high cost.

In the approach of Patent Literature 2, on the other hand, the electronic program guide information to be transmitted always contain a large amount of electronic program guide information from past to present. The large amount of data results in a high transmission load, regardless of whether it is received via the broadcast or communication path.

Furthermore, the approaches of Patent Literatures 1 and 2 both require the viewer to take the trouble to start and display the electronic program guide in order to watch a past program.

Citation List
  Patent Literatures
    Patent Literature 1: Japanese Patent Unexamined Publication No. 2004-193920
    Patent Literature 2: Japanese Patent Unexamined Publication No. H11-341371

SUMMARY OF THE INVENTION

The television receiver of the present invention connects to a program distribution server so as to receive and play back past program data. The television receiver includes a broadcast data reception unit, an IP data reception unit, a remote control reception unit, a storage unit, and a control unit. The broadcast data reception unit receives currently broadcast program data and program information, the program information containing server identification information which identifies the program distribution server. The IP data reception unit receives the past program data from the program distribution server. The remote control reception unit receives viewing program information as a remote control signal, the viewing program information containing viewing channel information and/or viewing date-and-time information. The storage unit stores at least the program information received. The control unit determines whether program data indicated by the viewing program information is past program data based on the viewing date-and-time information when the remote control reception unit has received the viewing program information. When determining that the program data indicated by the viewing program information is past program data, the control unit obtains the server identification information contained in the program information stored in the storage unit, and controls the IP data reception unit to connect to the program distribution server indicated by the server identification information and then to receive the program data identified by the viewing channel information and/or the viewing date-and-time information. When determining that the program data indicated by the viewing program information is not past program data, the control unit controls the broadcast data reception unit to receive the program data identified by the viewing program information.

With this structure, the viewer can watch a past program only by entering numerals to specify the channel and the date and time of the past program without using an electronic program guide. This operation is as simple as choosing a currently broadcast program with the remote control, thereby allowing the viewer to seamlessly enjoy a currently broadcast program and a past program.

The viewer cannot obtain the URL of a program distribution server without receiving a broadcast. This allows a broadcaster to take the initiative in operating program distribution servers having past programs, and also makes the content copyrightable.

The method of the present invention for receiving program data by connecting a television receiver to a program distribution server so as to receive and play back past program data includes: a program information storing step for receiving currently broadcast program data, and receiving and storing program information containing server identification information which identifies the program distribution server; a viewing program information receiving step for receiving viewing program information from a remote control, the viewing program information containing viewing channel information and/or viewing date-and-time information; a past program determining step for determining, based on the viewing date-and-time information, whether program data indicated by the viewing program information is past program data; a first program data receiving step for, when the program data indicated by the viewing program information is determined to be past program data, obtaining the server identification information contained in the program information stored in the program information storing step; connecting to the program distribution server indicated by the server identification information; and receiving the program data identified by the viewing channel information and/or the viewing date-and-time information; and a second program data receiving step for, when the program data indicated by the viewing program information is determined not to be past program data, receiving the program data identified by the viewing program information.

DETAILED DESCRIPTION OF PREFERRED EMBODIMENTS

A television receiver according to exemplary embodiments of the present invention will be described as follows with reference to drawings. If not otherwise specified, it is assumed that currently broadcast programs are received through a broadcast network such as a digital satellite or terrestrial broadcast, and that the connection to program distribution servers and the distribution of past programs therefrom are performed through IP (Internet Protocol) network which provides broadband Internet access.

Figure 1:
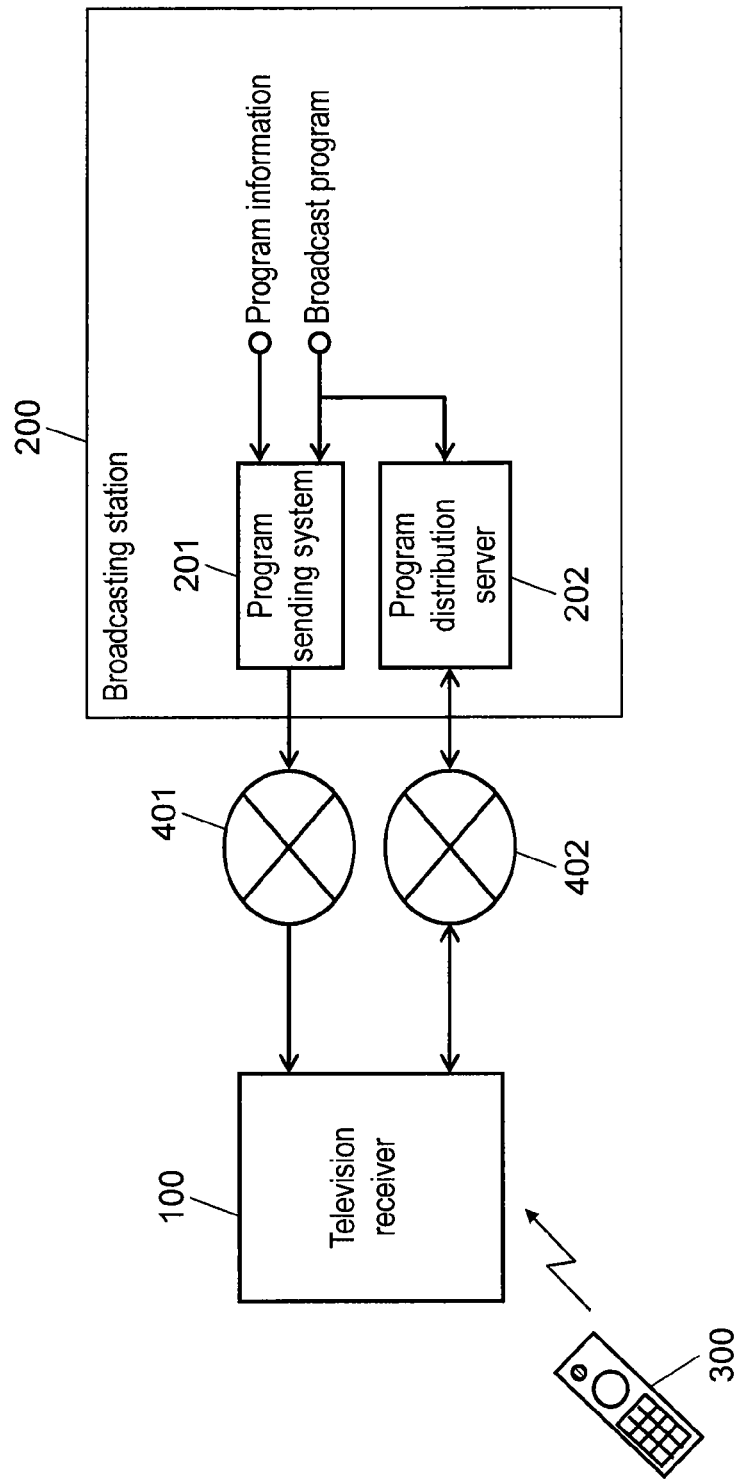
FIG. 1 is a schematic diagram of a network to which the television receiver of the present invention is connected.

FIG. 1 is a schematic diagram of a network in which the television receiver of the present invention is connected to a broadcasting station. Broadcasting station 200 includes program sending system 201 and program distribution server 202. Program sending system 201 sends broadcast programs (video and audio content) and program information associated therewith. Program distribution server 202 stores and distributes past broadcast programs. The program information contains the URL (Uniform Resource Locator) information of program distribution server 202. Television receiver 100 receives broadcasts from program sending system 201 via broadcast network 401, and is bidirectionally connected to program distribution server 202 via IP network (that is, the Internet) 402. The viewer generally operates television receiver 100 with remote control 300.

First Exemplary Embodiment

Figure 2:
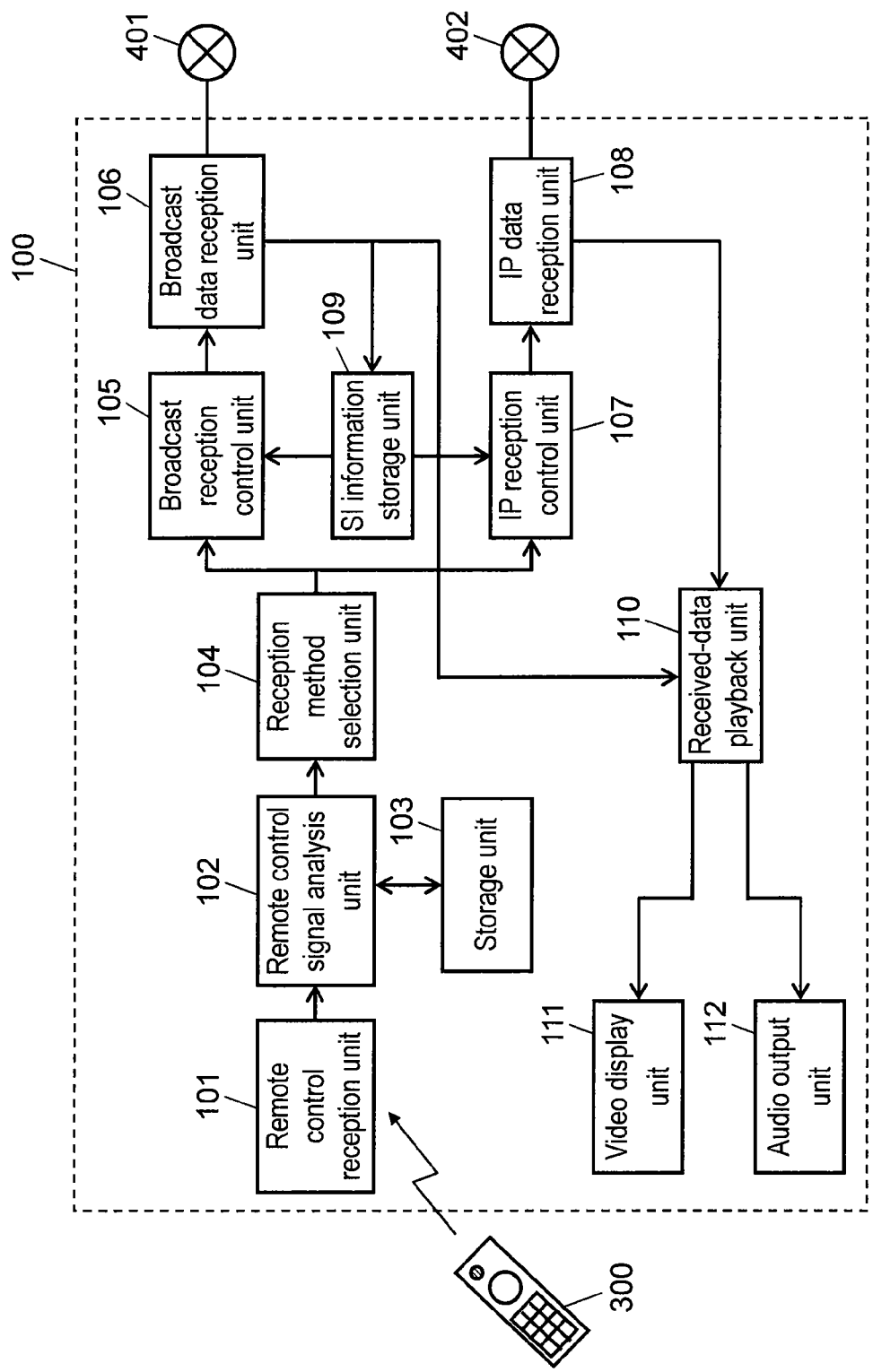
FIG. 2 is a block diagram of a configuration example of a television receiver according to a first exemplary embodiment of the present invention.

FIG. 2 is a block diagram of an internal configuration of television receiver 100 according to a first exemplary embodiment of the present invention.

As shown in FIG. 2, television receiver 100 includes remote control reception unit 101, remote control signal analysis unit 102, storage unit 103, reception method selection unit 104, broadcast reception control unit 105, broadcast data reception unit 106, IP reception control unit 107, IP data reception unit 108, SI (Service Information) information storage unit 109, received-data playback unit 110, video display unit 111, and audio output unit 112.

In FIG. 2, remote control reception unit 101 receives a remote control signal which contains the viewing program information entered by the viewer via remote control 300 through, for example, infrared communication. To watch a currently broadcast program, the viewer can enter only channel information, but to watch a past program, he/she has to also enter the date-and-time information indicating the date and time when the program was broadcast. The remote control signal is analyzed by remote control signal analysis unit 102. Then, the viewing program information of the program specified by the viewer, such as the channel and the date and time is stored in storage unit 103, and also transmitted to reception method selection unit 104. The viewing program information stored in storage unit 103 is read by reception method selection unit 104 as needed.

Reception method selection unit 104 determines whether the program specified by the viewer is a currently broadcast program or a past broadcast program, based on the date-and-time information received from remote control signal analysis unit 102. According to the determination result, unit 104 determines which of broadcast data and IP data should be received. Reception method selection unit 104 then transmits the information about the specified program to either broadcast reception control unit 105 in charge of broadcast data or IP reception control unit 107 in charge of IP data.

At the direction of reception method selection unit 104, broadcast reception control unit 105 controls broadcast data reception unit 106 to set a reception channel and to output received data to received-data playback unit 110.

Broadcast data reception unit 106 selects the set channel, extracts a packet of MPEG-2 compressed program content data from the TS (Transport Stream) data of a currently broadcast program, and transmits the packet to received-data playback unit 110. The TS data of a currently broadcast program contains SI information, which is related to the program. Broadcast data reception unit 106 extracts the SI information and stores it to SI information storage unit 109. SI information is broadcast-program-related information data, and is specified in the digital broadcasting standard. SI information includes an item called an SDT (Service Description Table), which contains broadcast channel information to be transmitted, such as the name of a broadcast channel and the name of a broadcaster. The SDT contains the URL information of program distribution server 202, which is required to obtain a past program.

IP reception control unit 107 accesses SI information storage unit 109 in accordance with the instructions from reception method selection unit 104, and reads the URL information of program distribution server 202 that corresponds to the viewing program information received from remote control signal analysis unit 102. IP reception control unit 107 then transmits the URL information to IP data reception unit 108 together with the date-and-time information of the past program.

IP data reception unit 108 transmits the date-and-time information received from IP reception control unit 107 to the URL of program distribution server 202 so as to receive the corresponding past program data from this server 202, and outputs the data to received-data playback unit 110.

Received-data playback unit 110 extracts video and audio data from the program data received from either broadcast data reception unit 106 or IP data reception unit 108, and applies the MPEG-2 decoding process to the extracted video and audio data so as to return them into baseband video and audio signals. Received-data playback unit 110 then outputs these signals to video display unit 111 and audio output unit 112, respectively.

Reception method selection unit 104, broadcast reception control unit 105, and IP reception control unit 107 together form a block which, as a control unit, receives the viewing program information from remote control signal analysis unit 102, thereby controlling the whole part of television receiver 100.

The following is a detailed description of the process of obtaining a desired program from the corresponding program distribution server 202. It is assumed that program distribution servers 202 are provided to correspond to each broadcast channel. When there are, for example, ten broadcast channels, ten program distribution servers 202 are provided to correspond thereto, and are associated with connection URLs. The broadcast channel and the URL of program distribution server 202 corresponding to the channel are associated with each other in the SDT information, and the association is stored in SI information storage unit 109.

When the viewer chooses a past program, IP reception control unit 107 reads the URL of the corresponding program distribution server 202 from SI information storage unit 109. This URL is supplied to IP data reception unit 108, allowing television receiver 100 to be connected to the corresponding program distribution server 202 via uplink communication in IP network 402. The date-and-time information entered by the viewer via the remote control is transmitted to the corresponding program distribution server 202 via IP reception control unit 107 and IP data reception unit 108. As a result, the program in the time slot is transmitted from this program distribution server 202.

Figure 3:
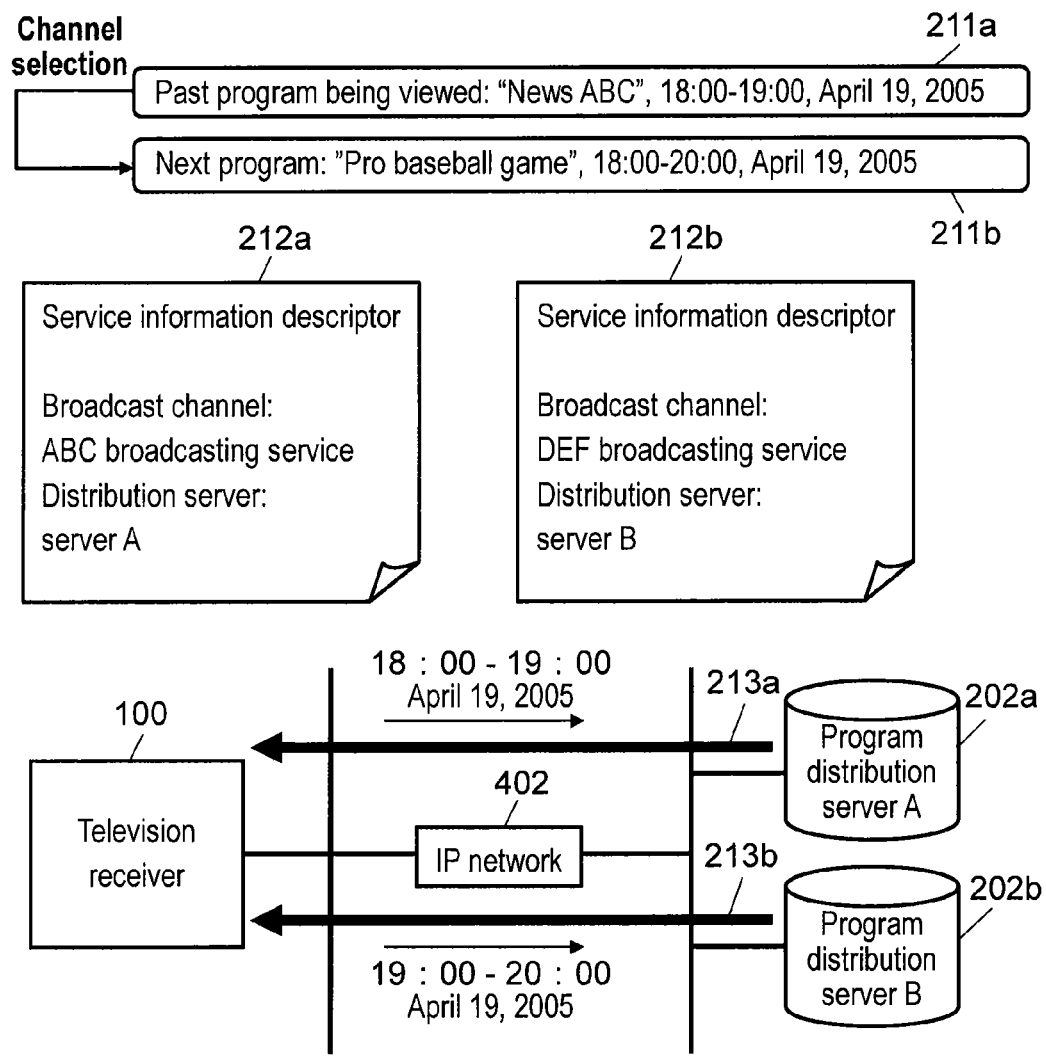
FIG. 3 shows connection between the television receiver according to the first exemplary embodiment of the present invention and program distribution servers.

FIG. 3 shows connection between television receiver 100 and program distribution servers 202 when the viewer chooses past programs in the present exemplary embodiment. In FIG. 3, the viewer first chooses past program "News ABC" 211a broadcast from 18:00 to 19:00, on Apr. 19, 2005 by an ABC broadcasting service, and then chooses past program "Pro baseball game" 211b broadcast from 18:00 to 20:00, on Apr. 19, 2005 by a DEF broadcasting service. The SDTs in the TS data of past programs 211a and 211b contain service information descriptors 212a and 212b, respectively. These descriptors 212a and 212b contain the broadcast channels (the broadcasting stations) and the URL information of program distribution servers 202a and 202b corresponding to the broadcast channels. The URLs of program distribution servers 202a and 202b corresponding to the broadcasting stations are previously stored in SI information storage unit 109 in television receiver 100. Therefore, television receiver 100 can be connected to program distribution servers 202a and 202b of the two different broadcasting stations using their URLs via IP network 402.

Then, as shown in FIG. 3, the date-and-time information is transmitted to program distribution servers 202a and 202b via uplink communication. The program distribution servers can recognize which past programs have been specified, and start to send the specified time slot parts of the corresponding past programs. In FIG. 3, bold arrows 213a and 213b pointing from program distribution servers 202a and 202b to television receiver 100 indicate program content flows.

Figure 4:
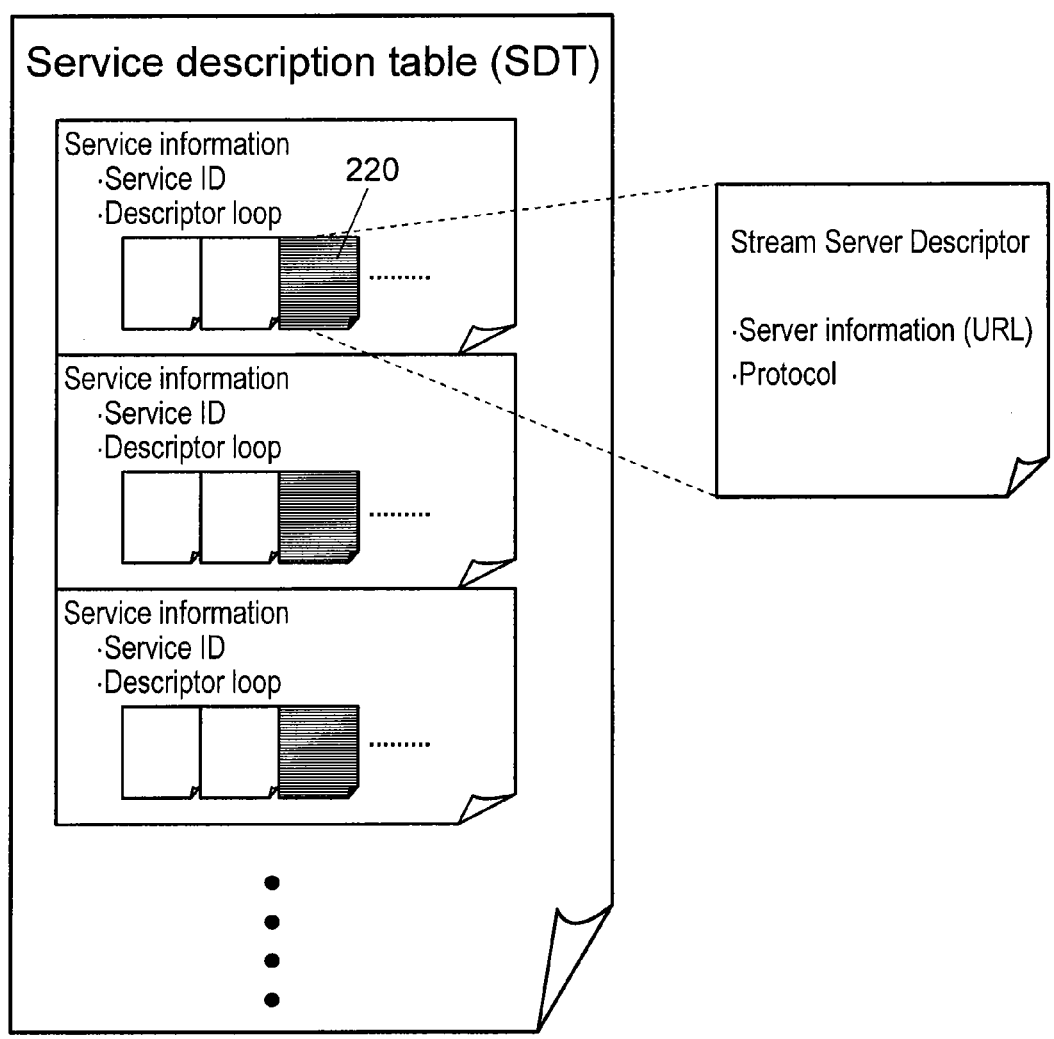
FIG. 4 shows a structure of SDT information in the first exemplary embodiment of the present invention.

FIG. 4 shows the arrangement of the program distribution server information in the above-described SDT. The SDT in the SI information sent from broadcasting station 200 contains organization channel information such as the name of an organization channel and the name of a broadcaster. The organization channel information is contained in the form of service information descriptors on the basis of each service or each service ID. In the present exemplary embodiment, there are provided program distribution server descriptors 220 (referred to as "stream server descriptors" in FIG. 4) as additional service information descriptors. Each descriptor 220 contains program distribution server information such as the URL of the corresponding program distribution server 202 and the protocol to be used (for example, HTTP).

The detailed standard of SI, SDT, and the like in digital broadcasting in Japan are described in "ARIB TR-B14", Terrestrial Digital Television Broadcasting Application Rule Technical Material, Association of Radio Industries and Businesses.

Figure 5:
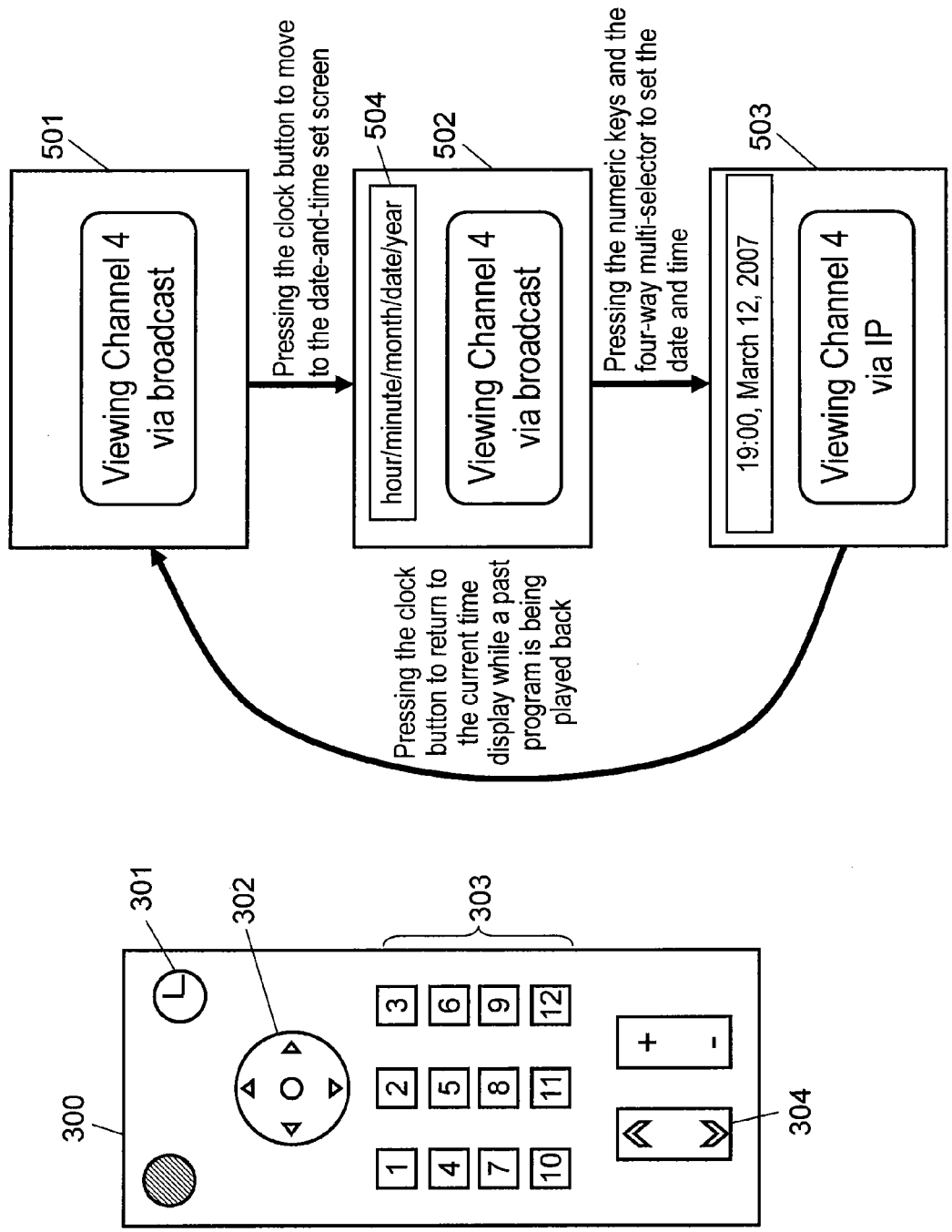
FIG. 5 shows an operation example of a remote control in the first exemplary embodiment of the present invention.

FIG. 5 shows an operation example of a remote control when the viewer actually chooses a past program on television receiver 100 of the present exemplary embodiment, and examples of the display screen. Remote control 300 includes clock button 301, four-way multi-selector 302, numeric keys 303, and channel up/down key 304. Four-way multi-selector 302, numeric keys 303, and channel up/down key 304 have the same functions as their equivalents in conventional remote controls. Clock button 301 is used for the viewer to choose the mode to specify the date and time in order to watch a past program.

It is assumed that the viewer, who is watching Channel 4 as shown in screen 501, wants to watch a past program. The viewer first presses clock button 301 to display a date-and-time set screen. In the date-and-time set screen, date-and-time input box 504 is displayed at the upper center of screen 502. Then, the viewer presses numeric keys 303 and four-way multi-selector 302 to set a desired date and time. As a result, the viewer can watch the past program received via IP from the corresponding program distribution server 202 as shown on screen 503. The channel is not changed during the specification of the past program in this example, which means that this past program is also on Channel 4. If the viewer presses clock button 301 again while watching the past program, the clock returns to the current time display, and the program currently being broadcast on Channel 4 is displayed. In other words, screen 501 is resumed.

Figure 6:
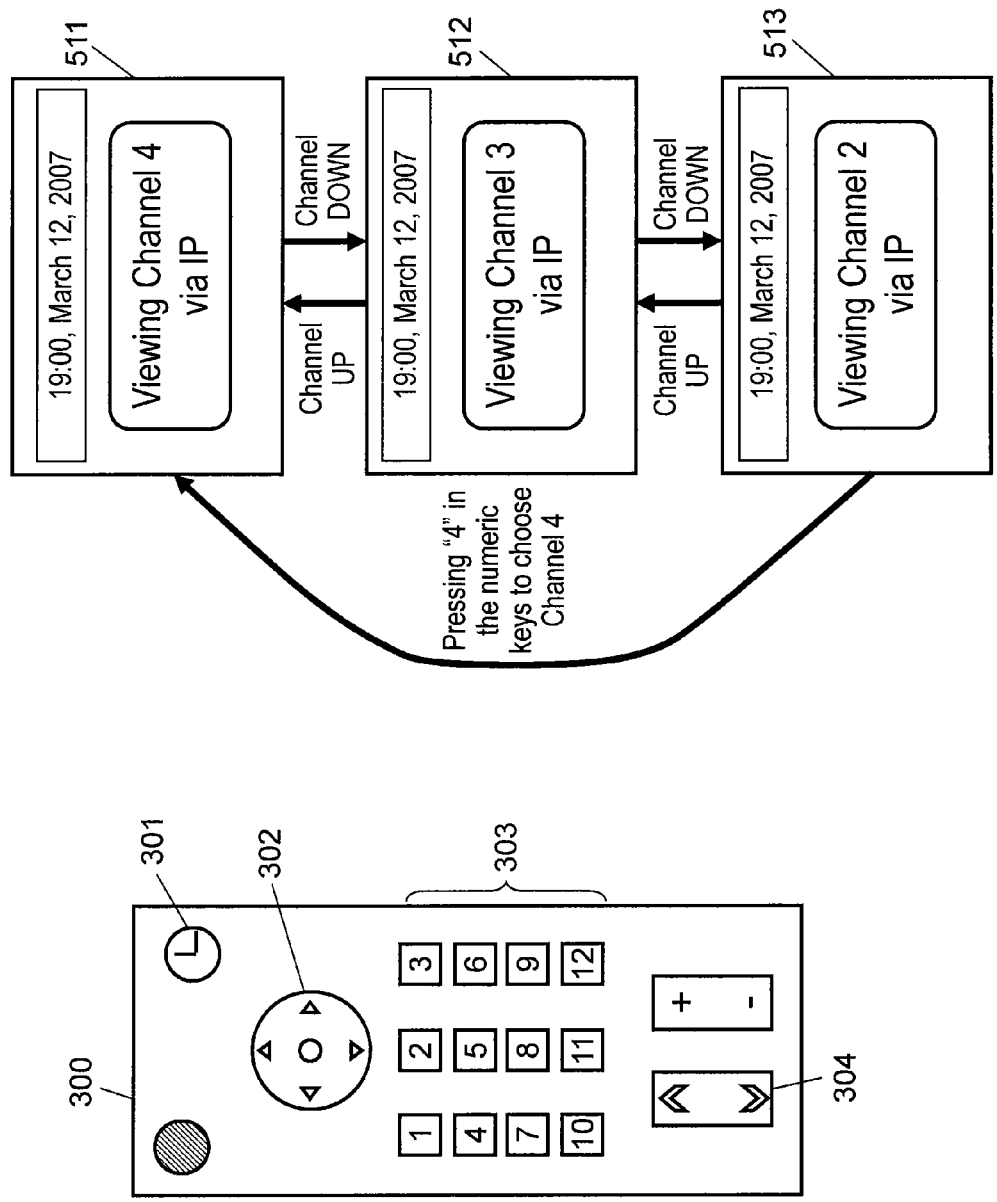
FIG. 6 shows another operation example of the remote control in the first exemplary embodiment of the present invention.

FIG. 6 shows another operation example of remote control 300 and other examples of the display screen. Unlike in FIG. 5, the viewer has changed the channel while watching a past program. It is assumed that the viewer is watching a past program (started at 19:00 on Mar. 12, 2007) on Channel 4 via IP as shown in screen 511. In this example, when the viewer changes the channel to Channel 3 using channel up/down key 304, program distribution server 202 for Channel 4 is replaced by program distribution server 202 for Channel 3. As a result, the past program which was broadcast on Channel 3 at the same date and time as the program shown in screen 511 is displayed as shown in screen 512. If the viewer further decreases the channel using channel up/down key 304, program distribution server 202 for Channel 3 is replaced by program distribution server 202 for Channel 2. As a result, the past program which was broadcast on Channel 2 at the same date and time as the program shown in screen 512 is displayed as shown in screen 513.

If the viewer presses "4" in numeric keys 303, screen 511 is resumed, and the past program on Channel 4 is displayed again. Thus, the channel change is performed by the viewer pressing numeric keys 303 and channel up/down key 304 in the same manner as in normal broadcast reception.

When the viewer chooses a channel not having past programs, the screen may display an error message to inform the viewer of the absence of past programs, or may be blacked out. Alternatively, it is possible to skip a channel not having server information.

Figure 7:
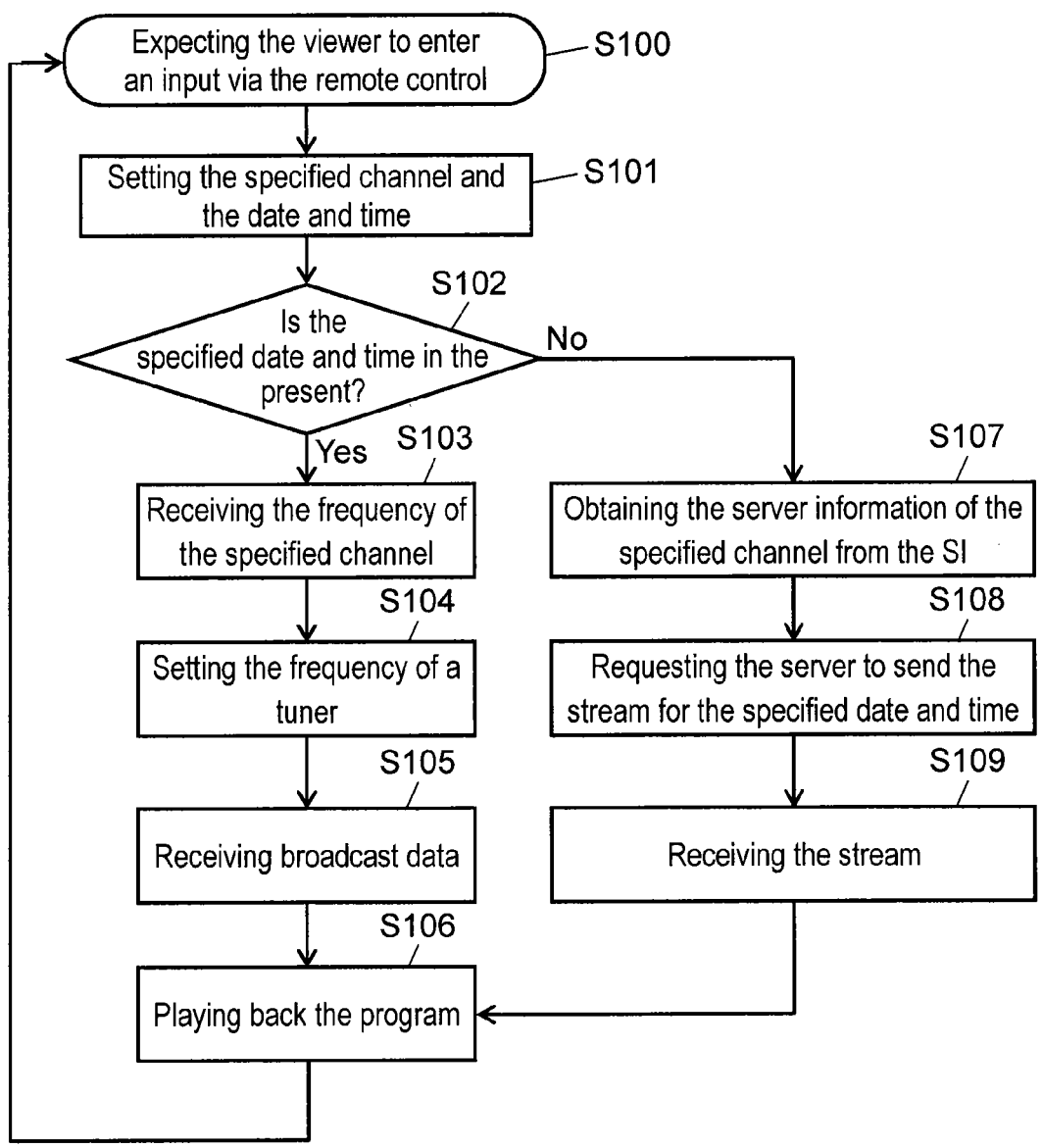
FIG. 7 is a flowchart showing an operation procedure of the television receiver according to the first exemplary embodiment of the present invention.

FIG. 7 is a flowchart showing an operation procedure of television receiver 100 when the viewer is going to watch a program which either is currently being broadcast or was broadcast in the past.

The following is a description, with reference to FIGS. 7 and 2, of the operation of television receiver 100.

In FIG. 7, television receiver 100 is expecting the viewer to enter an input via the remote control (Step S100). Remote control reception unit 101 receives channel information from the viewer via remote control 300, and the channel and the date and time which have been specified by the viewer and analyzed by remote control signal analysis unit 102 are set (Step S101). Reception method selection unit 104 determines whether the specified date and time is the present or not (Step S102). When the date and time is the present ("Yes" in Step S102), the process goes to Step S103 to perform normal broadcast reception. More specifically, broadcast data reception unit 106 receives the frequency of the specified channel from broadcast reception control unit 105 (Step S103), and sets the frequency of a tuner (not shown) to the received frequency (Step S104). Unit 106 then receives broadcast data (Step S105: a second program data receiving step), and transmits the broadcast data to received-data playback unit 110. Received-data playback unit 110 plays back the program (Step S106). When the specified date and time is in the past, on the other hand, ("No" in Step S102), reception method selection unit 104 selects to receive via IP. IP reception control unit 107 obtains the program distribution server information (the URL) of the specified channel from the SI information (from the SDT information in the SI information) of the past program stored in SI information storage unit 109 (Step S107). IP data reception unit 108 connects to the corresponding program distribution server 202 so as to transmit the specified date and time, and requests this server 202 to send the past program stream for this date and time (Step S108). IP data reception unit 108 receives the past program stream from the corresponding program distribution server 202 (Step S109: a first program data receiving step), and transmits the received data to received-data playback unit 110. Received-data playback unit 110 plays back the past program (Step S106).

In the procedure shown in FIG. 7, the viewer specifies the date and time by pressing clock button 301 on remote control 300 (FIG. 5), and therefore, the operations in Steps S103 to S106 are performed based on the determination result in Step S102. However, when the viewer specifies the channel directly without pressing clock button 301 (FIG. 6), the determination in Step S102 is unnecessary.

As described above, television receiver 100 of the present exemplary embodiment allows the viewer to watch a past program only by entering numerals to specify the channel and the date and time of the past program without using an electronic program guide. This operation is as simple as choosing a currently broadcast program with the remote control, thereby allowing the viewer to seamlessly enjoy a currently broadcast program and a past program.

The viewer cannot obtain the URL of program distribution server 202 without receiving a broadcast. This allows a broadcaster to take the initiative in operating program distribution servers 202 having past programs, and also makes the content copyrightable.

IP data distributed from program distribution servers 202 has to be compressed at a higher compression ratio than the broadcast data due to IP network range limitation. Furthermore, the data rate at which television receiver 100 can receive data via IP network greatly depends on the network environment to which television receiver 100 is connected. For this reason, there are cases where program distribution server 202 stores a plurality of pieces of program data having different data rates. In such cases, the viewer can predetermine the data rate at which he/she wants to receive data from program distribution server 202. As a result, program data can be received at the data rate most suitable to the network environment to which television receiver 100 is connected.

There is a time lag after television receiver 100 accesses a past program and before the program data is received. Therefore, if the viewer, who is watching a past program, chooses another program based on the internal clock information of television receiver 100, he/she receives the another program which was broadcast at the time different from the specified time only by the time lag. To solve this problem, the internal clock information of television receiver 100 can be corrected based on the time information transmitted from program distribution server 202 at a constant period.

Second Exemplary Embodiment

The following is a description of the operation of television receiver 120 according to a second exemplary embodiment of the present invention. In the first exemplary embodiment, the information (URL) of program distribution server 202 which distributes a currently broadcast program as a past program is contained in the SDT in SI information, and a desired program is requested and obtained from program distribution server 202 having the URL identified from the SDT information. In the present exemplary embodiment, on the other hand, the URL of program distribution server 202 is contained in an EIT (Event Information Table) in SI information, and a desired program is requested and obtained from program distribution server 202 having the URL identified from the EIT information.

Figure 8:
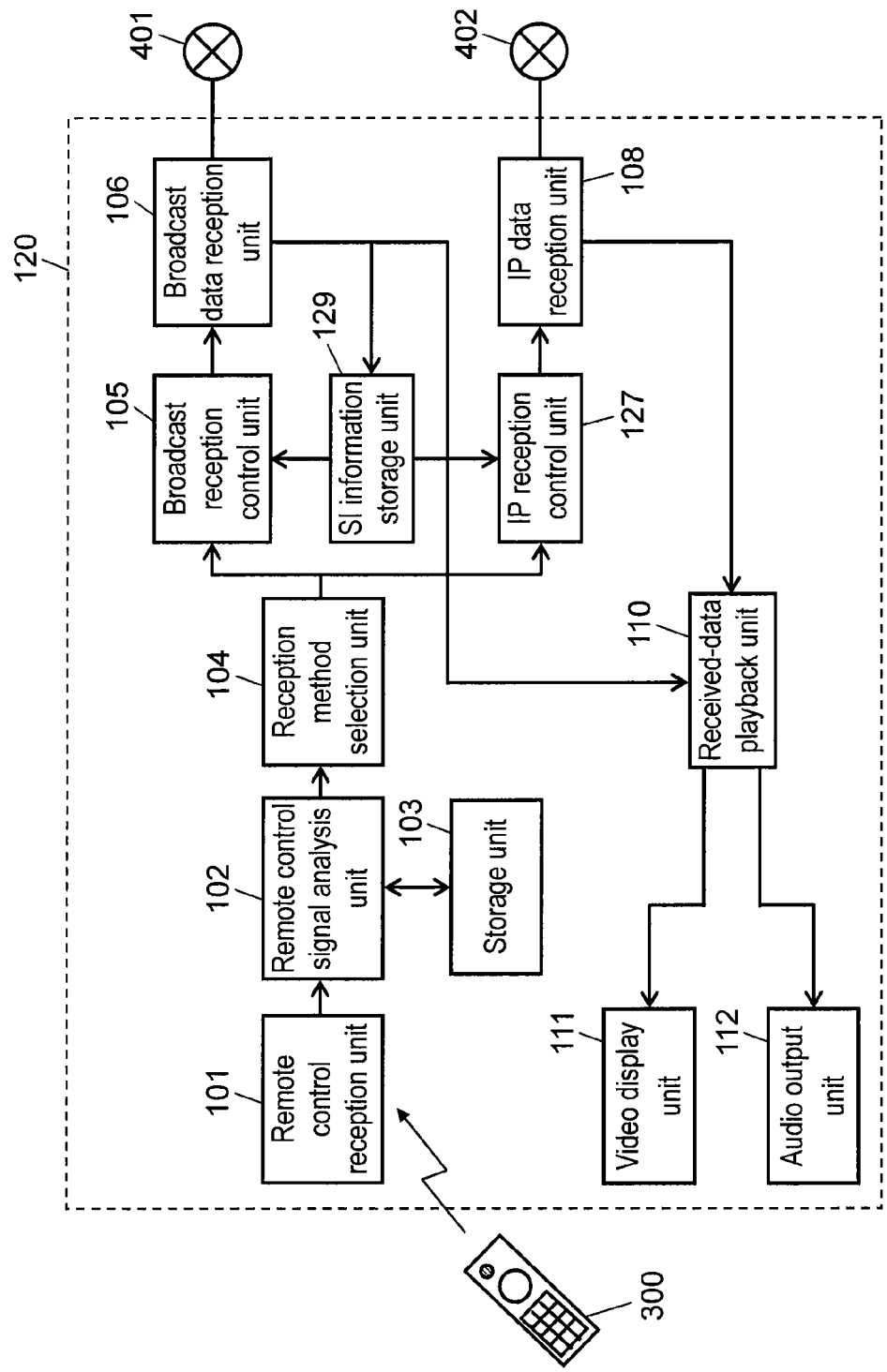
FIG. 8 is a block diagram of a configuration example of a television receiver according to a second exemplary embodiment of the present invention.

FIG. 8 is a block diagram of an internal configuration of television receiver 120. FIG. 8 differs from FIG. 2 only in having SI information storage unit 129 and IP reception control unit 127 in place of SI information storage unit 109 and IP reception control unit 107, respectively. The other components are referred to by the same reference numerals as in FIG. 2, and the description thereof will be omitted.

In FIG. 8, SI information storage unit 129 stores distribution server information (URL) contained in the EIT in SI information in association with the channel and the date and time of a broadcast program.

At the direction of reception method selection unit 104, IP reception control unit 127 accesses SI information storage unit 129 to read the URL information of program distribution server 202, which has been received from remote control signal analysis unit 102. IP reception control unit 127 then transmits the URL information to IP data reception unit 108 together with the date-and-time information.

Figure 9:
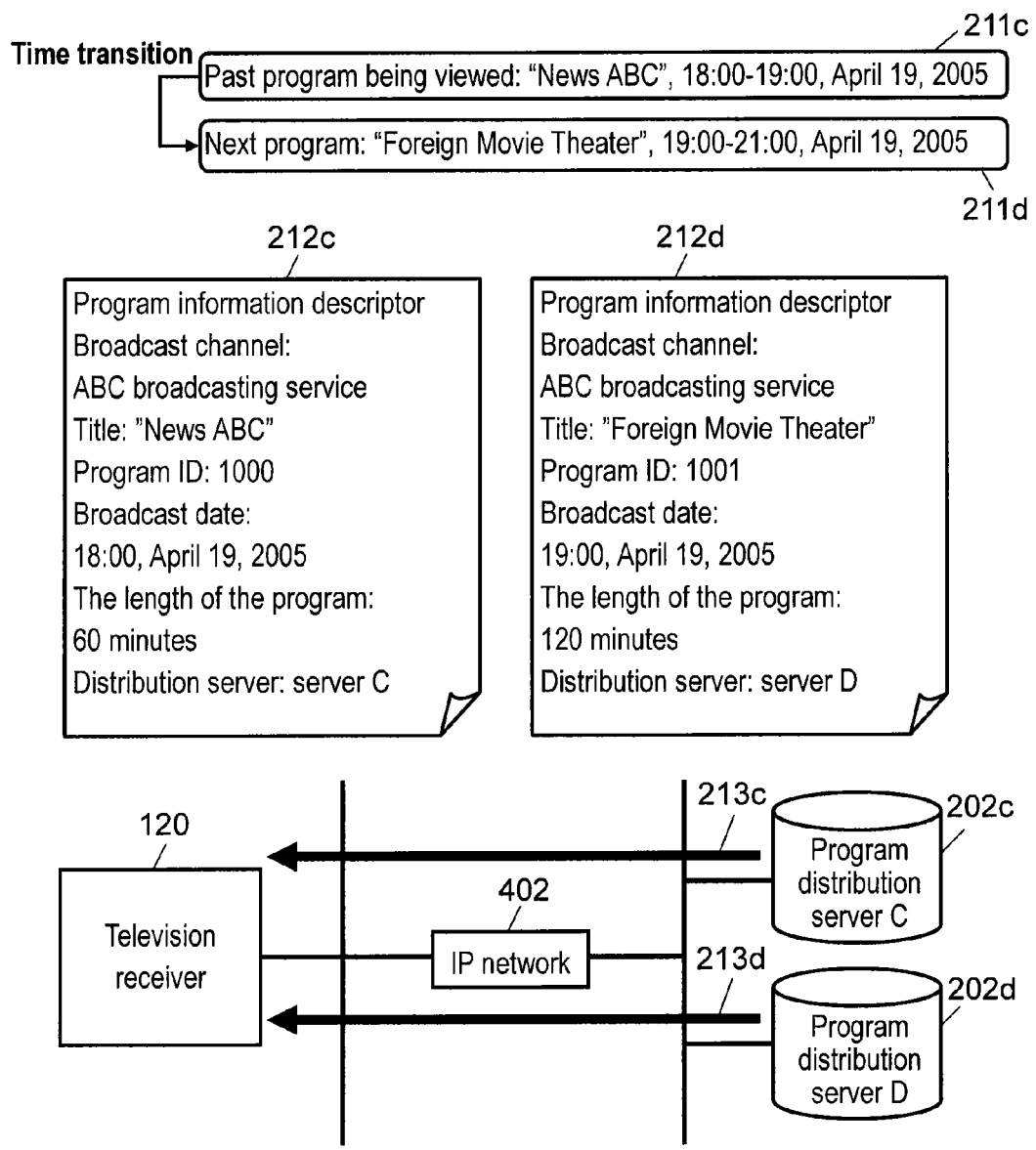
FIG. 9 shows connection between the television receiver according to the second exemplary embodiment of the present invention and program distribution servers.

The following is a description, with reference to FIG. 9, of the operation of SI information storage unit 129 and IP reception control unit 127 shown in FIG. 8. FIG. 9 shows connection between television receiver 120 and program distribution servers when the viewer chooses past programs in the present exemplary embodiment. FIG. 9 differs from FIG. 3 in using, as program distribution server information to obtain a past program, EIT information instead of SDT information which is transmitted in a broadcast signal. The SDT information is the organization information of the channel of a program, such as the name of a broadcasting station and the broadcast time, whereas the EIT information contains detailed information about the program itself, such as the title of the program and associated information. It is possible to define program distribution servers 202 from program to program according to EIT information. The present embodiment is based on the assumption that EIT information contains program distribution server information (URL) defined from program to program.

In FIG. 9, the viewer first chooses past program "News ABC" 211c broadcast from 18:00 to 19:00 on Apr. 19, 2005 by an ABC broadcasting service, and then chooses past program "Foreign Movie Theater" 211d broadcast from 19:00 to 21:00 on Apr. 19, 2005 by the ABC broadcasting service. The EIT in the TS data of past programs 211c and 211d while they were being broadcast contains not only information unique to the programs such as their start times, the lengths, and the performers, but also program information descriptors 212c and 212d containing the URL information of the distribution servers. In this case, each program is associated with a program ID, and contains title information, thus making it possible to set individual program distribution servers 202 from program to program. The URLs of program distribution servers 202c and 202d corresponding to the broadcasting stations are previously stored in SI information storage unit 129 of television receiver 120. Therefore, television receiver 120 can be connected to program distribution servers 202c and 202d of the same broadcasting station using their URLs via IP network 402.

Then, as shown in FIG. 9, the date-and-time information is transmitted to program distribution servers 202c and 202d via uplink communication. Program distribution servers 202c and 202d can recognize which past programs have been specified, and start to send the specified time slot parts of the corresponding past programs. In FIG. 9, bold arrows 213c and 213d pointing from program distribution servers 202c and 202d to television receiver 120 indicate program content flows.

Since URLs are logical addresses, the servers corresponding to these URLs are not necessarily separate hardware devices. Each program has only to be associated with a unique URL.

Figure 10:
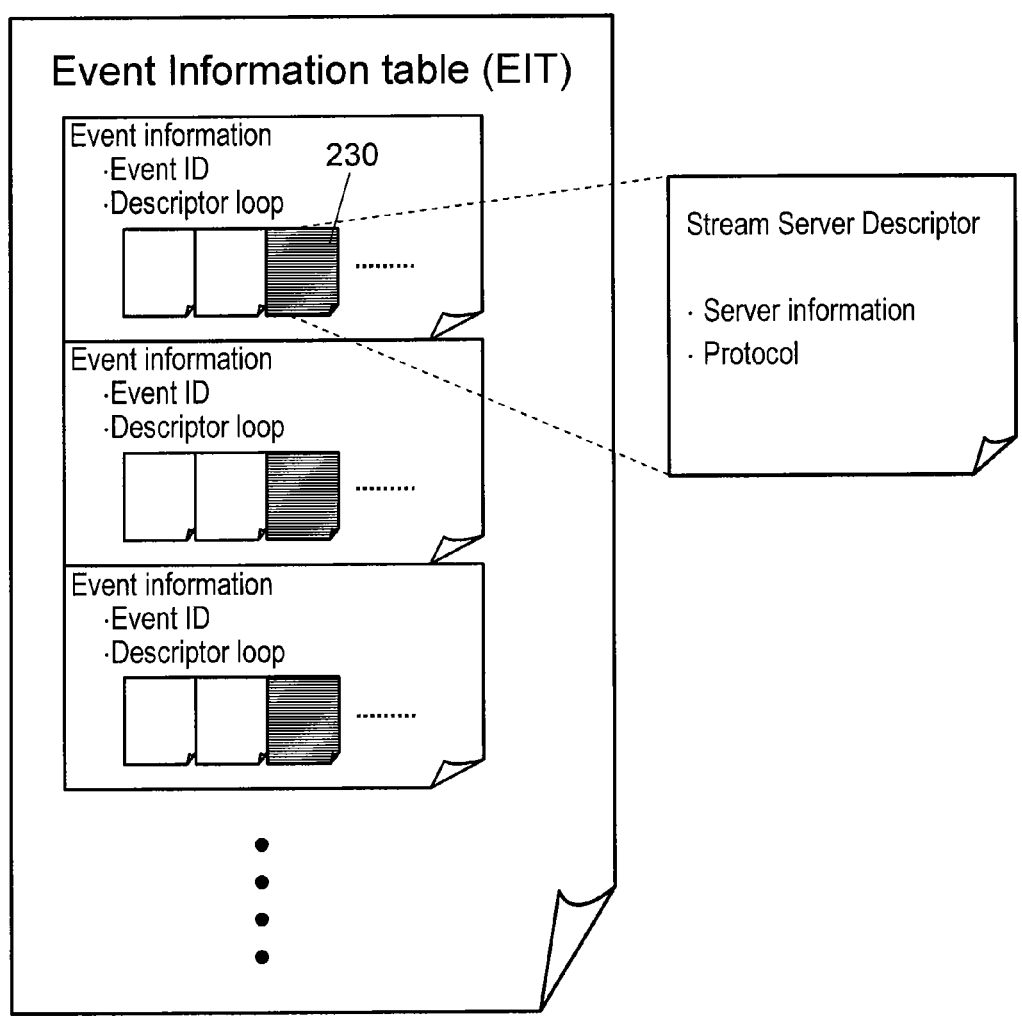
FIG. 10 shows a structure of EIT information in the second exemplary embodiment of the present invention.

FIG. 10 shows the arrangement of the program distribution server information in the EIT. The EIT in the SI information sent from broadcasting station 200 contains detailed information about the program itself such as the title of the program and associated information. The detailed information is contained in the form of service information descriptors on the basis of each event or each event ID. In the present exemplary embodiment, there are provided program distribution server descriptors 230 (referred to as "stream server descriptors" in FIG. 10) as additional service information descriptors. Each descriptor 230 contains the URL of the corresponding program distribution server 202 and the protocol to be used.

Figure 11:
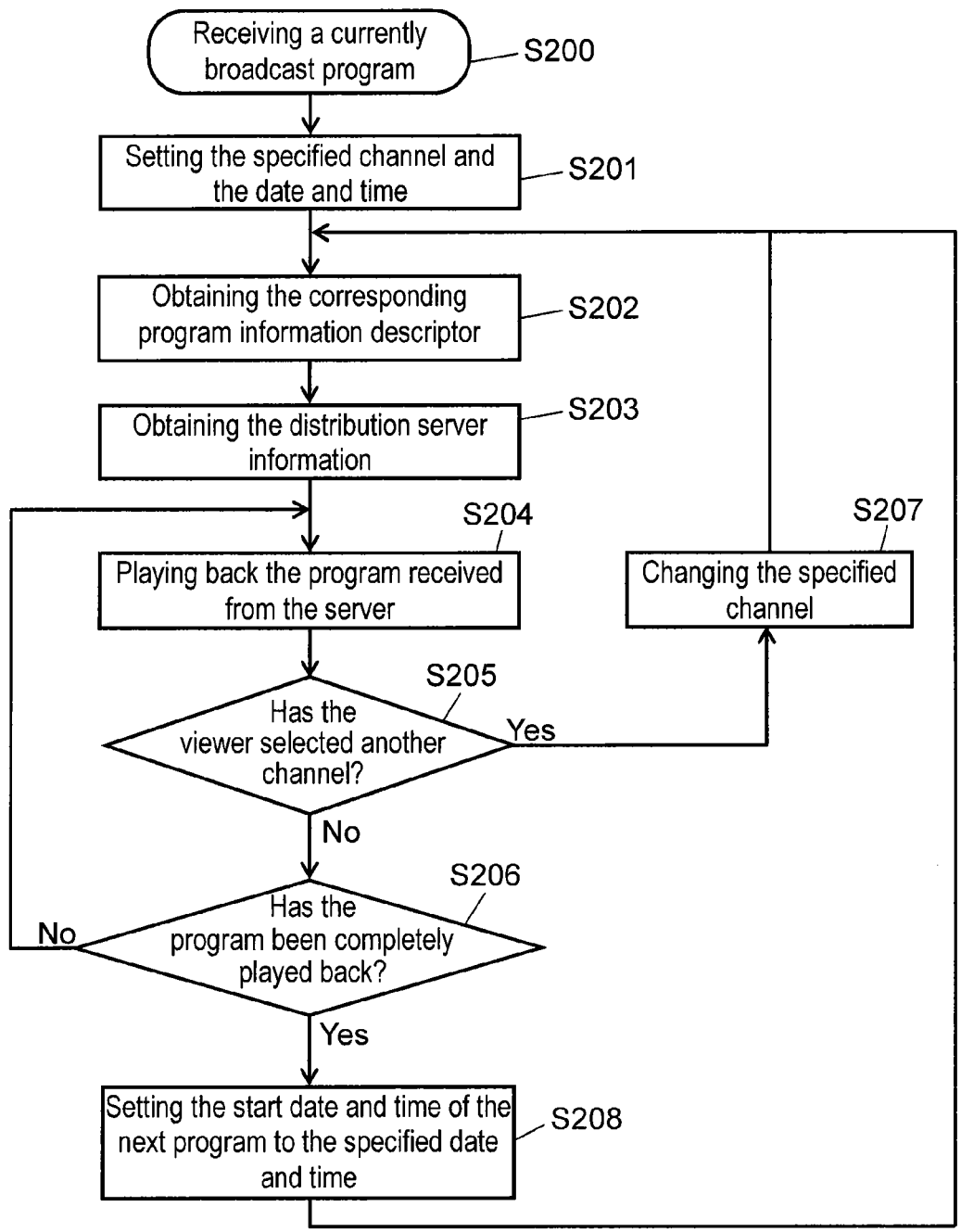
FIG. 11 is a flowchart showing an operation procedure of the television receiver according to the second exemplary embodiment of the present invention.

FIG. 11 is a flowchart showing an operation procedure of television receiver 120 when the viewer is going to watch a program which either is currently being broadcast or was broadcast in the past. The following is a description, with reference to FIGS. 8 and 11, of the operation of television receiver 120.

In FIG. 11, television receiver 120 is receiving a currently broadcast program (Step S200). Remote control reception unit 101 receives the channel information of a past program chosen by the viewer via remote control 300, and the channel and the date and time which have been specified by the viewer and analyzed by remote control signal analysis unit 102 are set (Step S201). IP reception control unit 127 obtains the corresponding program information descriptor (Step S202). SI information storage unit 129 of television receiver 120 stores program distribution server information contained in the program information descriptors in the EIT information back to a predetermined time in the past. Therefore, the program information descriptors can be obtained from the information stored in SI information storage unit 129. Next, IP reception control unit 127 obtains the program distribution server information contained in the program information descriptors (Step S203). IP data reception unit 108 is connected to the corresponding program distribution server 202 using this information (the URL) and receives the desired past program. Received-data playback unit 110 plays back the received program data (Step S204).

Then, remote control reception unit 101 detects whether the viewer has selected another channel during playback of the past program (Step S205). When the viewer has selected another channel ("Yes" in Step S205), the specified channel is changed (Step S207), and the process returns to Step S202. In this case, the date and time has not been changed. Therefore, in Step S202, IP reception control unit 127 obtains the program information descriptor on the same date and time on a different channel from SI information storage unit 129.

When the viewer has not selected another channel ("No" in Step S205), the process goes to Step S206 where it is detected whether received-data playback unit 110 has completed playback of the past program. When received-data playback unit 110 is in the middle of playback of the program ("No" in Step S206), the process returns to Step S204 to continue playback of the past program.

When received-data playback unit 110 has completed playback of the program ("Yes" in Step S206), on the other hand, IP reception control unit 127 sets the start date and time of the temporally next program (Step S208), and the process returns to Step S202. As a result, when the specified past program is played back to the end, television receiver 120 can automatically start to play back the immediately subsequent past program. FIG. 11 omits the step of playing back a currently broadcast program.

As described hereinbefore, television receiver 120 of the present exemplary embodiment has, in addition to the effect described in the first exemplary embodiment, the ability to respond flexibly to different program distribution servers 202 set for different programs on the transmitter side.

Third Exemplary Embodiment

Figure 12:
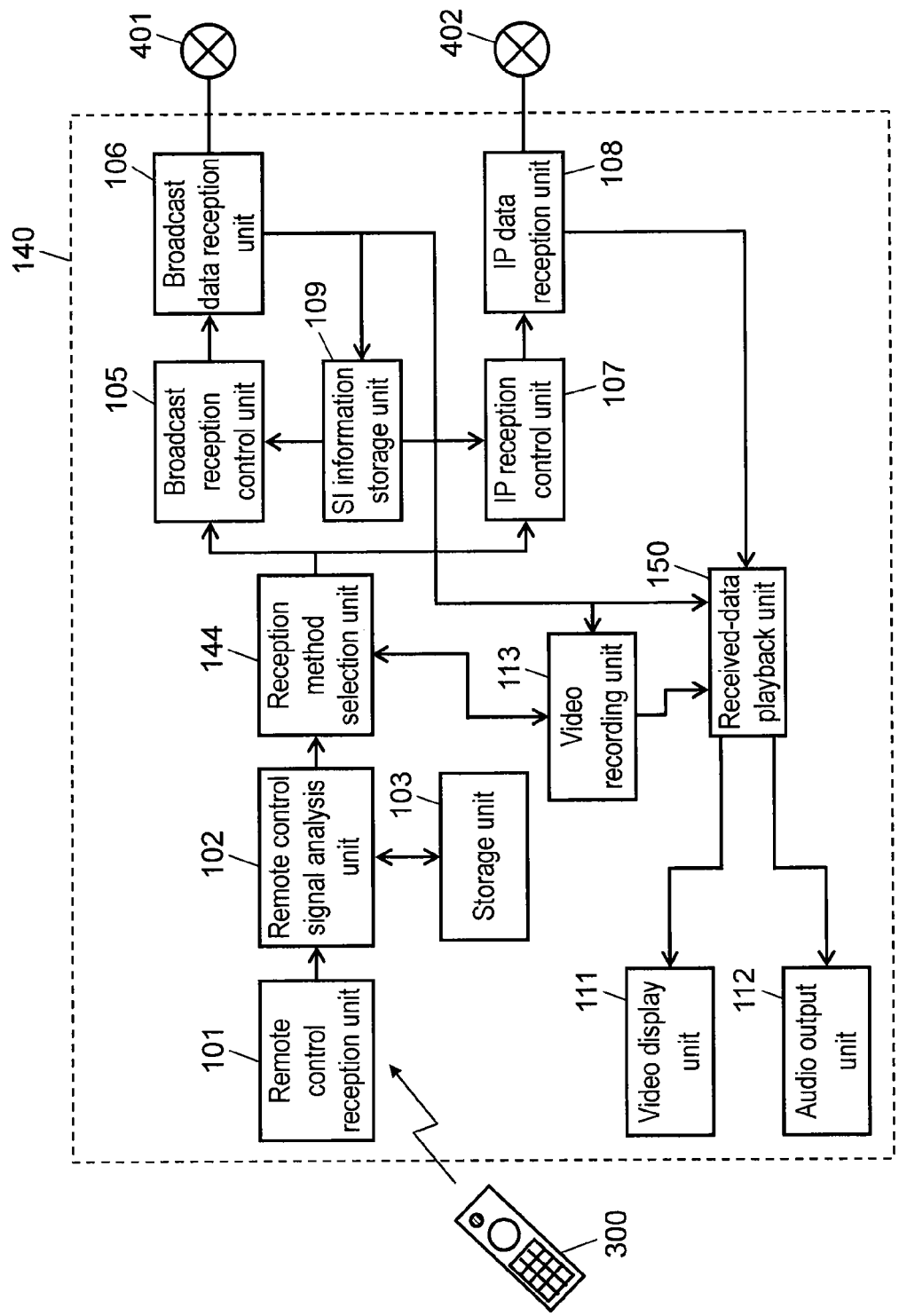
FIG. 12 is a block diagram of a configuration example of a television receiver according to a third exemplary embodiment of the present invention.
Figure 13:
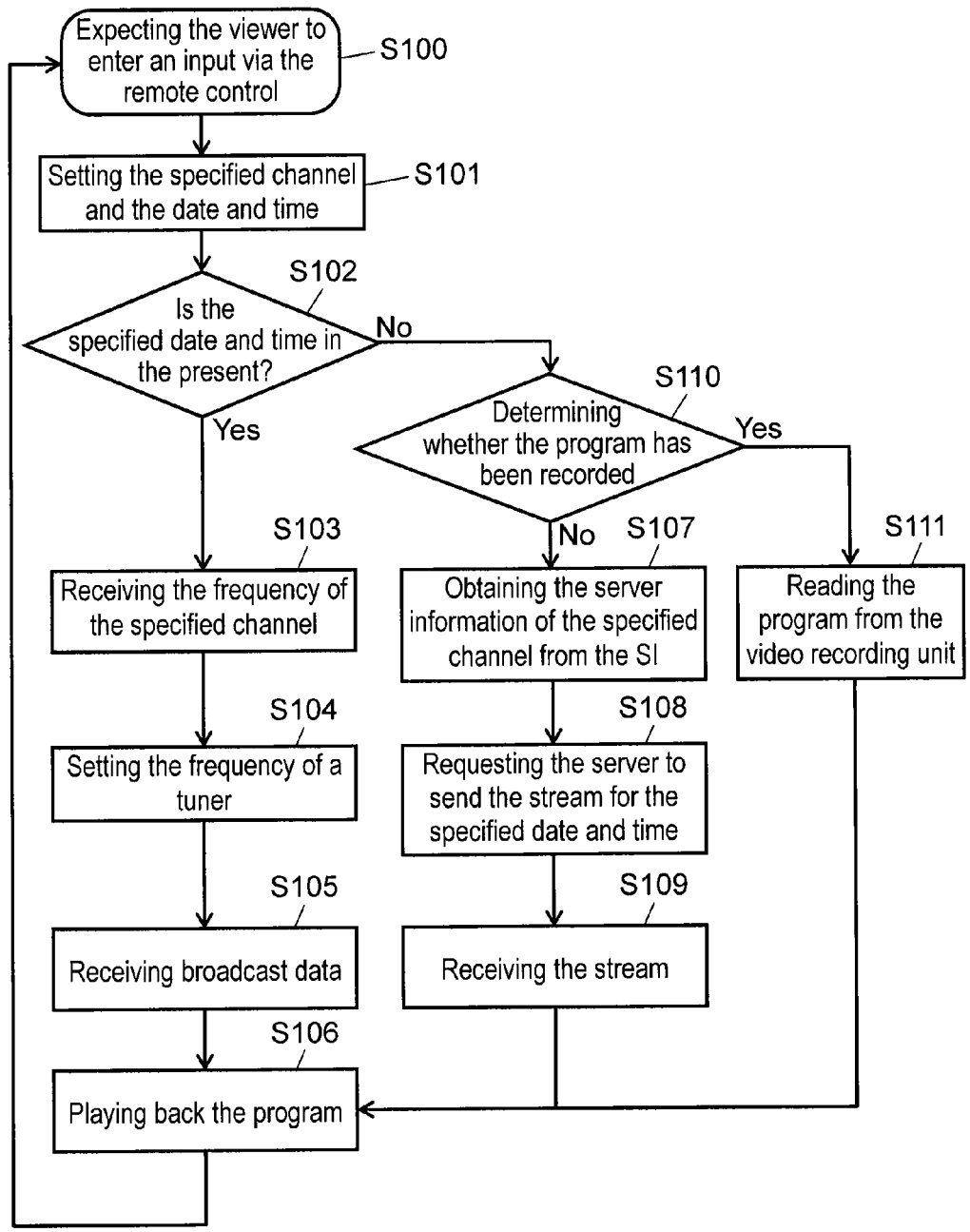
FIG. 13 is a flowchart showing an operation procedure of the television receiver according to the third exemplary embodiment of the present invention.

The following is a description, with reference to FIGS. 12 and 13, of the operation of television receiver 140 according to a third exemplary embodiment of the present invention. In the first exemplary embodiment, past programs specified by the viewer are always obtained from program distribution servers 202. In the present exemplary embodiment, on the other hand, television receiver 140 includes a storage unit for temporarily storing currently broadcast programs, and if the viewer specifies a program stored in the storage unit, the program can be played back from the storage unit and watched.

FIG. 12 is a block diagram of an internal configuration of television receiver 140. FIG. 12 differs from FIG. 2 in having video recording unit 113, and accordingly, having reception method selection unit 144 and received-data playback unit 150 in place of reception method selection unit 104 and received-data playback unit 110, respectively. Reception method selection unit 144 can select video recording unit 113, and received-data playback unit 150 has the function of playing back recorded programs read from video recording unit 113. The other components are referred to by the same reference numerals as in FIG. 2, and the description thereof will be omitted.

Video recording unit 113 is a large-capacity storage device such as a hard disk recorder. Unit 113 receives a currently broadcast program from broadcast data reception unit 106 based on recording instructions from the viewer or timer recording information, and records the program.

Reception method selection unit 144 makes an inquiry to video recording unit 113 about whether the program has been recorded in video recording unit 113 by providing unit 113 with the channel, and the date-and-time information of the program received from remote control signal analysis unit 102. When the program is in video recording unit 113, reception method selection unit 144 is not connected to the corresponding program distribution server 202 to receive the program because it is unnecessary. Instead, unit 144 reads the specified program from video recording unit 113 and outputs it to received-data playback unit 150.

Received-data playback unit 150 receives the program data according to the reception method selected by reception method selection unit 144 (through one of broadcast data reception unit 106, IP data reception unit 108, and video recording unit 113). Unit 150 then plays back the program, and outputs it to video display unit 111 and audio output unit 112.

Thus, video recording unit 113 can not only store program data, but also store the channel and the date-and-time information of each program and determine whether the information about the specified program is pertinent to the recorded program.

FIG. 13 is a flowchart showing an operation procedure of television receiver 140 when the viewer is going to watch a program which either is currently being broadcast or was broadcast in the past. FIG. 13 differs from FIG. 7 in having Step S110 for determining whether a program has been recorded, and Step S111 for reading a program from video recording unit 113. The other steps are referred to by the same step numbers as in FIG. 7, and the description thereof will be omitted.

In FIG. 13, when reception method selection unit 144 has determined that the specified date and time is not the present ("No" in Step S102), the process goes to Step S110. Reception method selection unit 144 makes an inquiry to video recording unit 113 about whether the past program whose channel and date and time have been specified in Step S101 is in video recording unit 113 (Step S110). When the determination is affirmative ("Yes" in Step S110), reception method selection unit 144 reads the program from video recording unit 113 (Step S111). Then, received-data playback unit 150 obtains and plays back the recorded data (Step S106).

As described hereinbefore, in television receiver 140 of the present exemplary embodiment, playback of past programs is performed by using data recorded in video recording unit 113. This makes playback more stable and at higher quality than in the case of using program data received via IP network 402, and can also reduce traffic in IP network 402.

Video recording unit 113 is contained in television receiver 140 in FIG. 12, but may alternatively be an external video recording device connected to television receiver 140 from outside, such as a DVD recorder.

Fourth Exemplary Embodiment

Figure 14A:
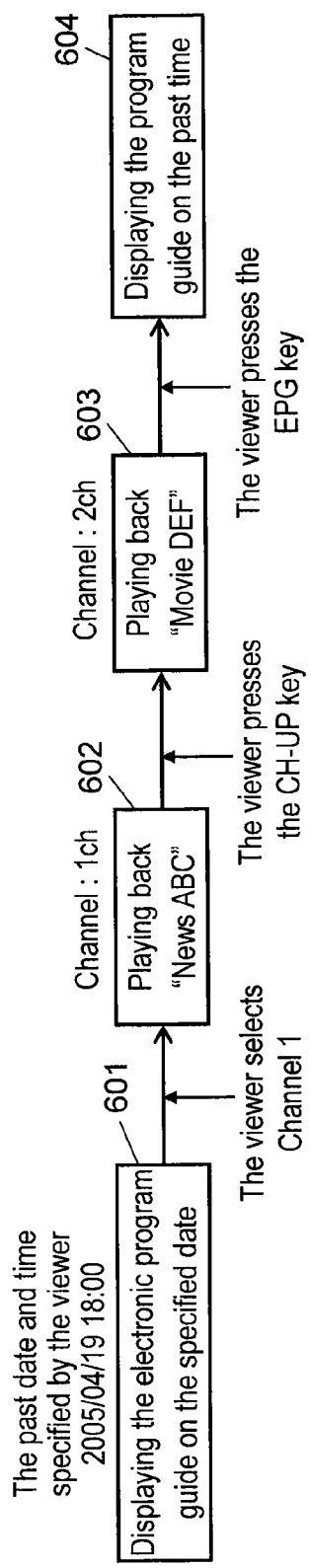
FIG. 14A shows changes in the display screen according to the viewer's channel selection in a television receiver according to a fourth exemplary embodiment of the present invention.
Figure 14B:
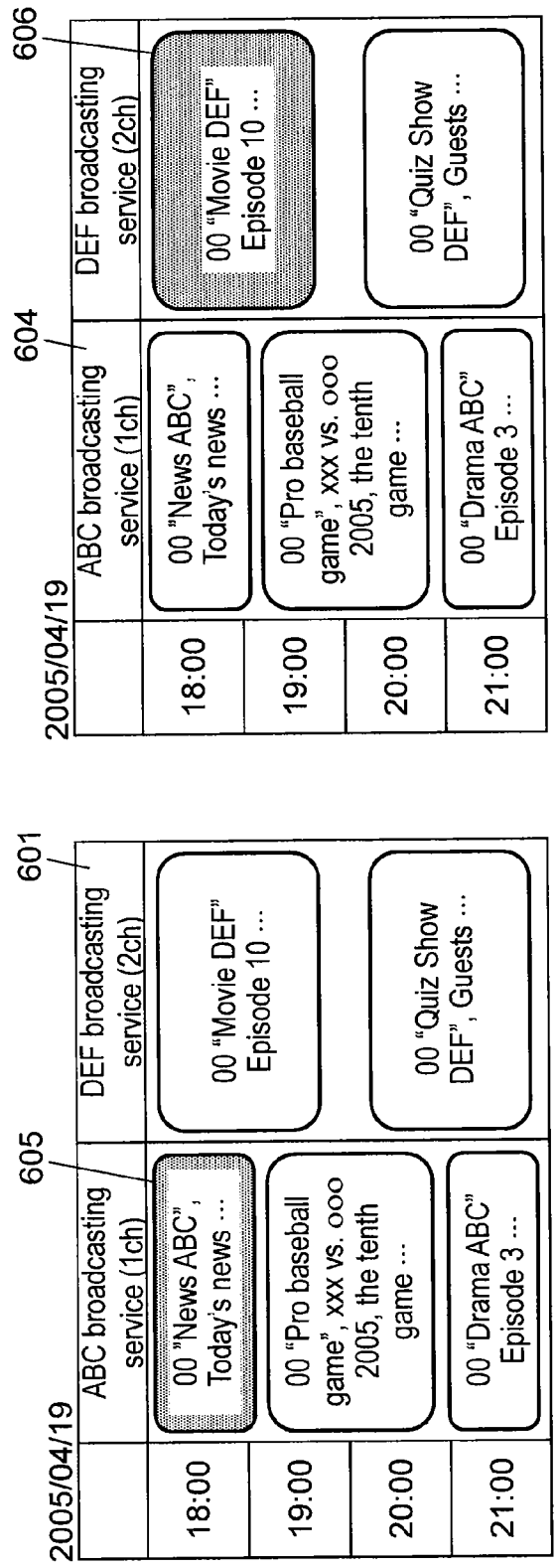
FIG. 14B shows changes in the electronic program guide on the display screen according to the viewer's channel selection in the television receiver according to the fourth exemplary embodiment of the present invention.

The following is a description of a fourth exemplary embodiment of the present invention. In the first to third exemplary embodiments, the viewer chooses a past program only via a remote control; in the present exemplary embodiment, however, the viewer can also use an electronic program guide (EPG). FIGS. 14A and 14B show changes in the display screen to explain operations in the present exemplary embodiment. FIG. 14A shows changes in the display screen according to the viewer's channel selection, and FIG. 14B shows changes in the electronic program guide on the display screen according to the viewer's channel selection.

The viewer presses clock button 301 of remote control 300 first, and then enters the date-and-time information of a desired program using numeric keys 303 and other keys so as to request the display of an electronic program guide. As a result, the electronic program guide is displayed on screen 601. Then, if the viewer chooses Channel 1, the program ("News ABC" in this case) information 605 in the electronic program guide is highlighted on screen 601. When the channel and the date and time of the specified program are determined in this manner, the program distribution server information corresponding to this is read, and television receiver 100 is connected to the corresponding program distribution server 202. When the specified date and time is in the time slot of the currently broadcast program, television receiver 100 receives the currently broadcast program. The program distribution server information can be obtained either by the method of the first exemplary embodiment (using SDT information) or the method of the second exemplary embodiment (using EIT information). Then, television receiver 100 receives past program "News ABC" 602 from program distribution server 202 and plays it back.

If the viewer changes the channel to Channel 2 using channel up/down key 304 of remote control 300, the program distribution server 202 to be connected is changed to play back past program "Movie DEF" 603. If the viewer switches the display to the electronic program guide by operating television receiver 100, the electronic program guide is displayed on screen 604. In this case, program "Movie DEF" information 606 on Channel 2 in the electronic program guide is highlighted on screen 604. Thus, in the case of using an electronic program guide, the viewer can specify the channel and the date and time of a past program, and then obtain the corresponding program distribution server information in the same manner as in the case of using the remove control only. The viewer can specify the date and time of a past program on the electronic program guide only by entering numerals via remote control 300, indicating viewer-friendly specification of past programs. The viewer can also see programs on other channels in the same time slot on the electronic program guide.

Figure 15:
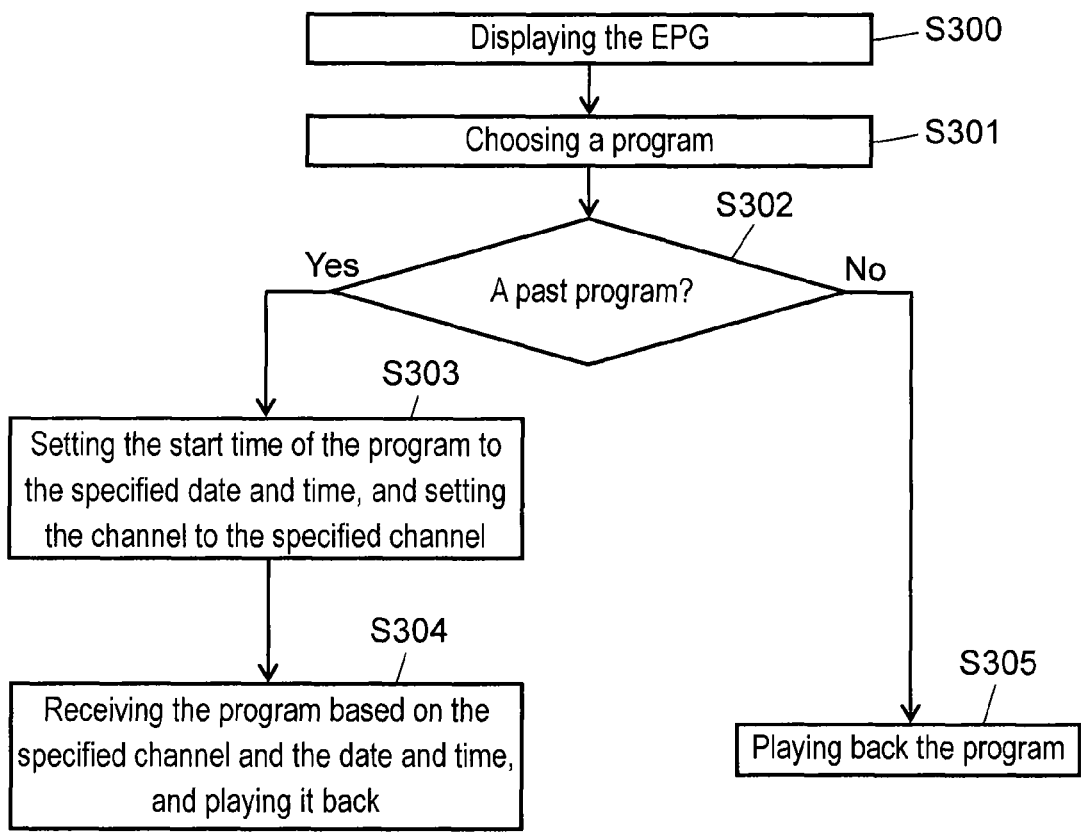
FIG. 15 is a flowchart showing an operation procedure of the television receiver according to the fourth exemplary embodiment of the present invention.

FIG. 15 is a flowchart showing an operation procedure of television receiver 100 to perform the operations shown in FIG. 14A. In FIG. 15, the viewer displays the electronic program guide on receiver 100 (Step S300). The viewer chooses a program by specifying the channel and the date and time (Step S301). Receiver 100 determines whether the program was broadcast in the past, based on the date-and-time information (Step S302). When it is a past program ("Yes" in Step S302), receiver 100 obtains the information of the corresponding program distribution server 202 based on the specified channel and the date and time (Step S303). Receiver 100 receives the past program from the corresponding program distribution server 202 and plays it back (Step S304). When the program is not a past program ("No" in Step S302), receiver 100 receives the currently broadcast program and plays it back (Step S305).

As described hereinbefore, in the present exemplary embodiment, an electronic program guide is used as an aid in choosing a past program via a remote control. This allows the viewer to see other program information at the specified date and time, thereby further improving efficiency of program choice.

The electronic program guide for past programs may be stored in SI information storage unit 109 of television receiver 100 and may be read when displayed, or may alternatively be received from program distribution server 202 when displayed.

Other Exemplary Embodiments

In the first to fourth exemplary embodiments, Japanese digital broadcasting standard (ARIB) has been described, but the present invention is also applicable to standards used in other countries such as the U.S. or Europe.

For example, in the ATSC (Advanced Television Systems Committee) standard, which is the U.S. digital broadcasting standard, TS multiplexed program information is a PSIP (Program and System Information Protocol). A PSIP includes a list of all virtual channels, a VCT (Virtual Channel Table), and an EIT. The virtual channels have programs which are currently being broadcast or will be broadcast in the future. The VCT contains the number and name of each virtual channel. The EIT contains the title and technical information of future broadcast programs on the virtual channels.

Figure 16:
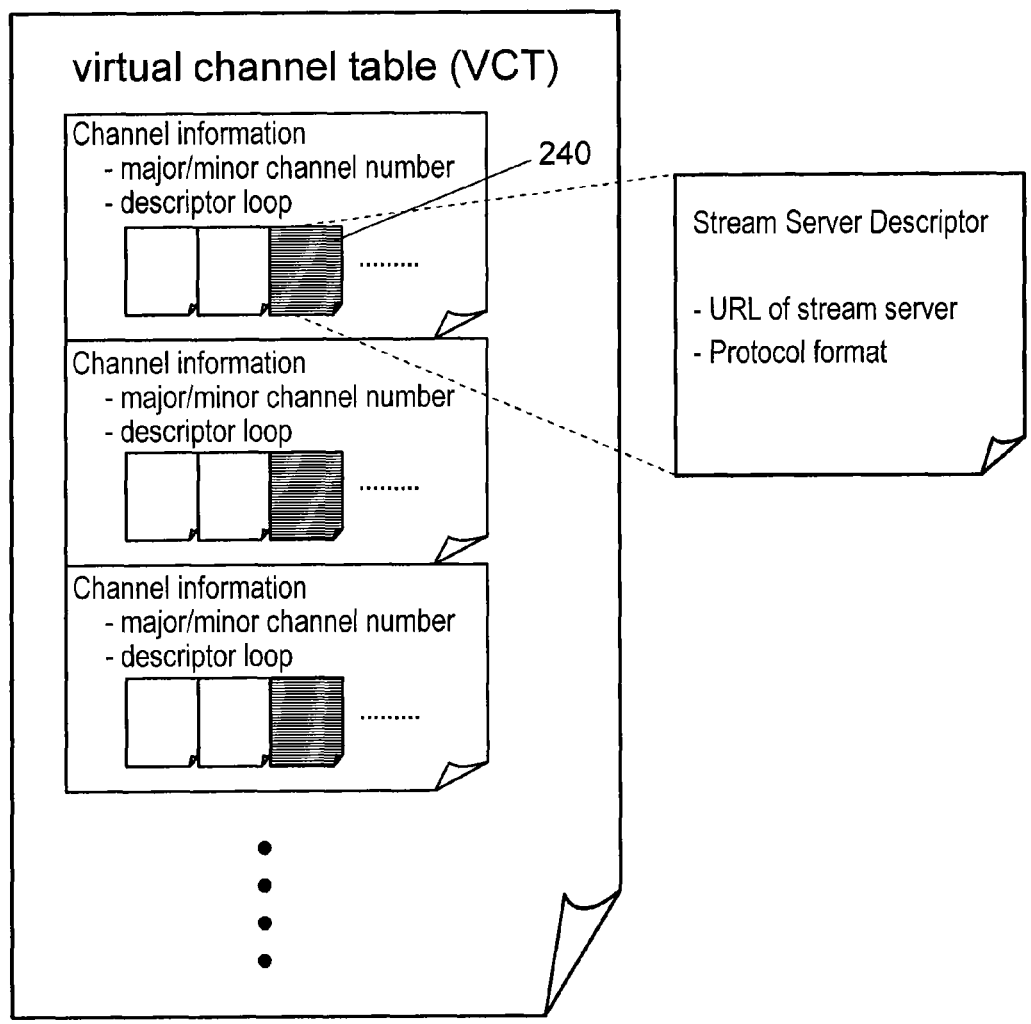
FIG. 16 shows the arrangement of program distribution server information in a VCT in other exemplary embodiments of the present invention.

FIG. 16 shows the arrangement of program distribution server (Stream Server) information in the VCT. The VCT contained in the PSIP information transmitted from a broadcasting station includes virtual channel information such as major and minor channel numbers in the form of service information descriptors. The numbers of the virtual channels are information that a broadcasting station allocates to each program. A major channel number corresponds to a physical channel number, and a minor channel number indicates the order of a program contained in a selected physical channel.

In the present exemplary embodiment, there are provided program distribution server descriptors 240 (referred to as "stream server descriptors" in FIG. 16) as additional service information descriptors. Each descriptor 240 contains program distribution server information such as the URL of the corresponding program distribution server and the protocol to be used. Thus, the present invention is applicable to the US ATSC standard, and is, although not described in detail, also applicable to the European DVB (Digital Video Broadcasting) standard.

In all the above-described exemplary embodiments, the URL of a program distribution server and the protocol to be used are written in program information such as an SDT or a VCT, but may alternatively be written in an NIT (Network Information Table). The NIT contains information about the network to which the program information is transmitted.

Industrial Applicability

The present invention is applicable to television receivers which allow the viewer to choose and watch TV programs broadcast in the past.

Reference Marks in the Drawings
100, 120, 140 television receiver
101 remote control reception unit
102 remote control signal analysis unit
103 storage unit
104, 144 reception method selection unit
105 broadcast reception control unit
106 broadcast data reception unit
107, 127 IP reception control unit
108 IP data reception unit
109, 129 SI information storage unit
110, 150 received-data playback unit
111 video display unit
112 audio output unit
113 video recording unit
200 broadcasting station
201 program sending system
202, 202a, 202b, 202c, 202d program distribution server
211a, 211b, 211c, 211d, 602, 603 past program
212a, 212b service information descriptor
212c, 212d program information descriptor
213a, 213b, 213c, 213d program content flow
220, 230, 240 program distribution server descriptor
300 remote control
301 clock button
302 four-way multi-selector
303 numeric keys
304 channel up/down key
401 broadcast network
402 IP network
501-503, 511-513, 601, 604 screen
504 date-and-time input box
605, 606 program information

The invention claimed is:

1. A television receiver connecting to a program distribution server so as to receive and play back past program data, the television receiver comprising:
   a broadcast data reception unit configured to receive currently broadcast program data and program information, the program information containing server identification information which identifies the program distribution server;
   an IP data reception unit configured to receive the past program data from the program distribution server;
   a remote control reception unit configured to receive viewing program information as a remote control signal, the viewing program information containing at least one of viewing channel information and viewing date-and-time information and being selected by a viewer independent of an electronic program guide (EPG);
   a storage unit for storing configured to receive at least the program information received; and
   a control unit configured to:
   a) determine whether program data indicated by the viewing program information is past program data based on the viewing date-and-time information when the remote control reception unit has received the viewing program information,
   b) obtain the server identification information contained in the program information stored in the storage unit, control the IP data reception unit to connect to the program distribution server indicated by the server identification information, and then receive the program data identified by at least one of the viewing channel information and the viewing date-and-time information when it is determined that the program data indicated by the viewing program information is past program data, and
   c) control the broadcast data reception unit to receive the program data identified by the viewing program information when it is determined that the program data indicated by the viewing program information is not past program data.

2. The television receiver of claim 1, wherein the server identification information is connection URL information of the program distribution server corresponding to one channel.

3. The television receiver of claim 1, wherein the server identification information is connection URL information of the program distribution server corresponding to one piece of program data.

4. The television receiver of claim 1, further comprising:
   a video recording unit for recording the currently broadcast program data, wherein
   when the remote control reception unit has received the viewing program information, the control unit determines whether the program data indicated by the viewing program information is past program data, based on the viewing date-and-time information;
   when determining that the program data indicated by the viewing program information is past program data, the control unit determines whether the program data indicated by the viewing program information has been recorded in the video recording unit; and
   when determining that the program data indicated by the viewing program information has been recorded in the video recording unit, the control unit controls the recorded program data indicated by the viewing program information to be played back.

5. The television receiver of claim 1, wherein
   the control unit controls an electronic program guide corresponding to the viewing date-and-time information received by the remote control reception unit to be displayed; specific past program data to be selected from the electronic program guide corresponding to the viewing date-and-time information; and the selected past program data to be received by the IP data reception unit.

6. A method for receiving program data by connecting a television receiver to a program distribution server so as to receive and play back past program data, the method comprising:
   receiving currently broadcast program data, and receiving and storing program information containing server identification information which identifies the program distribution server;
   receiving viewing program information from a remote control, the viewing program information containing at least one of viewing channel information and viewing date-and-time information and being selected by a viewer independent of an electronic program guide (EPG);
   determining, based on the viewing date-and-time information, whether program data indicated by the viewing program information is past program data;
   when the program data indicated by the viewing program information is determined to be past program data, obtaining the server identification information contained in the program information stored in the program information storing step, connecting to the program distribution server indicated by at least one of the server identification information, and receiving the program data identified by the viewing channel information and the viewing date-and-time information; and
   when the program data indicated by the viewing program information is determined not to be past program data, receiving the program data identified by the viewing program information.

* * * * *